United States Patent
Gondi et al.

(10) Patent No.: US 11,340,881 B2
(45) Date of Patent: May 24, 2022

(54) VALIDATION OF DESIRED SOFTWARE STATE IMAGE FOR HARDWARE INCOMPATIBILITIES

(71) Applicant: VMWARE, INC., Pato Alto, CA (US)

(72) Inventors: Anjaneya Prasad Gondi, Palo Alto, CA (US); Mukund Gunti, Palo Alto, CA (US); Alok Kumar Sinha, Palo Alto, CA (US); Nikitha Kandru, Palo Alto, CA (US); Yuedong Mu, Palo Alto, CA (US); Aravinda Haryadi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/033,987

(22) Filed: Sep. 28, 2020

(65) Prior Publication Data
US 2021/0311712 A1 Oct. 7, 2021

(30) Foreign Application Priority Data
Apr. 2, 2020 (IN) .............................. 202041014746

(51) Int. Cl.
*G06F 8/61* (2018.01)
*G06F 9/455* (2018.01)
(52) U.S. Cl.
CPC ............ *G06F 8/63* (2013.01); *G06F 9/45529* (2013.01)

(58) Field of Classification Search
CPC ... G06F 8/63; G06F 8/65; G06F 9/455; G06F 9/45529
See application file for complete search history.

(56) References Cited

U.S. PATENT DOCUMENTS

| | | | |
|---|---|---|---|
| 2002/0108033 A1* | 8/2002 | Kroening | G06F 8/658 713/1 |
| 2009/0089780 A1* | 4/2009 | Johnson | G06F 9/5077 718/1 |
| 2015/0186172 A1* | 7/2015 | Thomas | G06F 9/45533 718/1 |

* cited by examiner

*Primary Examiner* — Marina Lee
(74) *Attorney, Agent, or Firm* — Kim & Stewart LLP

(57) ABSTRACT

A method of validating a desired image of a virtualization software and a firmware package to be installed in a plurality of hosts against a hardware compatibility list (HCL) includes: acquiring hardware inventory of the hosts to determine hardware devices installed therein; for each of the hardware devices, searching for firmware and driver thereof in the HCL; for each driver included in the desired image that corresponds to one of the hardware devices, determining whether or not the driver is compatible according to the HCL; for each firmware included in the firmware package that corresponds to one of the hardware devices, determining whether or not the firmware is compatible according to the HCL; and validating the desired image of the virtualization software and the firmware package to be installed in the hosts if each of the hardware device has a compatible driver and a compatible firmware.

15 Claims, 10 Drawing Sheets

VALIDATION OF DESIRED SOFTWARE STATE IMAGE FOR HARDWARE INCOMPATIBILITIES

RELATED APPLICATIONS

Benefit is claimed under 35 U.S.C. 119(a)-(d) to Foreign Application Serial No. 202041014746 filed in India entitled "VALIDATION OF DESIRED SOFTWARE STATE IMAGE FOR HARDWARE INCOMPATIBILITIES", on Apr. 2, 2020, by VMware, Inc., which is herein incorporated in its entirety by reference for all purposes.

BACKGROUND

In many virtualization computing systems, virtualization software is installed on a cluster of hosts using an ISO image that is created from a flat list of software installation bundles (SIBs). An SIB is the smallest unit of software that can be shipped and installed, and these SIBs make up, for example, a base hypervisor image (hereinafter also referred to as "base image") from a virtualization software provider, as well as drivers, agents, and other software components from an OEM (original equipment manufacturer) and other vendors of hardware. In a typical installation, hundreds of these SIBs are packaged as one or more ISO images and installed in the hosts.

After installation, lifecycle management of the virtualization software becomes cumbersome and error-prone for several reasons. First, although different software developers create new versions or updates to the SIBs, the new versions or updates cannot be released independently. The releases have to be tightly controlled because it is likely that one SIB has a dependency to another SIB. As a result, new releases are made in the form of bulletins, which are a collection of software installation bundles, or as a new ISO image in which new SIBs from the virtualization software provider, the OEM, and other software vendors are packaged. Because of the inter-dependencies and the integration of the newly developed SIBs with other SIBs, it is difficult to make piecemeal changes to the virtualization software for easy consumption by an end user during the lifecycle of the virtualization software.

Furthermore, new releases come in many different forms. A complete release, e.g., a GA (general availability) release, may be made with an ISO image or a bulletin. The bulletin may be employed for partial releases as well, including rollup, patch, update, and extension. Very few end users understand the differences among these different types of partial releases and there are no clear rules that establish when and how a bulletin should be created for a particular type of release.

Consequently, over time, changes to the virtualization software are layered on top of each other and the final image of the virtualization software is not easily captured or described. Worse, history becomes a factor in that past bulletins may have included other SIBs, not overridden in later bulletins. For these reasons, the overall content is difficult to capture or describe, and the end user is unable to answer the question, "What is the current state of the virtualization software configured in each of the hosts in the cluster?" As such, if there is a particular desired state of the virtualization software that the user is interested in, the end user will have no way of knowing whether the current state is compliant with the desired state and, if not, how to make the current state compliant with the desired state.

SUMMARY

One or more embodiments provide a desired state model for managing the lifecycle of virtualization software. According to embodiments, components of virtualization software are grouped into release units that are each managed separately and are layered on top of each other in a standardized way so that developers can independently create and ship their software with proper naming and versioning for easy consumption by end users of the virtualization software.

In this desired state model, the virtualization software provider releases the base image which forms the foundation for everything. OEMs create add-ons that customize the base image for their servers. When the end user selects an OEM of the servers for hosting the virtualization software, the add-on for that OEM is layered on top of the base image. In addition, a firmware manifest is laid on top of the add-on. At the top are additional drivers and agents, e.g., those added in response to a user selection of solutions.

According to one embodiment, a desired image of a virtualization software and a firmware package to be installed in a plurality of hosts are validated against a hardware compatibility list. A method of validating the desired image and the firmware package against the hardware compatibility list includes the steps of: acquiring hardware inventory of each of the hosts to determine hardware devices installed in the hosts; for each of the hardware devices, searching for firmware and driver thereof in the hardware compatibility list; for each driver included in the desired image of the virtualization software that corresponds to one of the hardware devices, determining whether or not the driver is compatible according to the hardware compatibility list; for each firmware included in a desired version of the firmware package that corresponds to one of the hardware devices, determining whether or not the firmware is compatible according to the hardware compatibility list; and validating the desired image of the virtualization software and the firmware package to be installed in the hosts if each of the hardware device has a compatible driver and a compatible firmware in the desired image of the virtualization software and the firmware package.

Further embodiments include a non-transitory computer-readable storage medium comprising instructions that cause a computer system to carry out the above method, as well as a computer system configured to carry out the above method.

DETAILED DESCRIPTION

According to embodiments, SIBs, more generally referred to herein as payloads, are logically grouped into "components." In the embodiments, a component is a unit of shipment and installation, and a successful installation of a component typically will appear to the end user as enabling some specific feature. For example, if a software vendor wants to ship a user-visible feature that requires a plug-in, a driver, and a solution, the software vendor will create separate payloads for each of the plug-in, the driver, and the solution, and then group them together as one component. From the end user's perspective, it is sufficient to install this one component onto a server to enable this feature on the server. A component may be part of another software image, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image includes a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that the OEM wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability), and NSX (network virtualization platform of VMware, Inc.).

Figure 1:
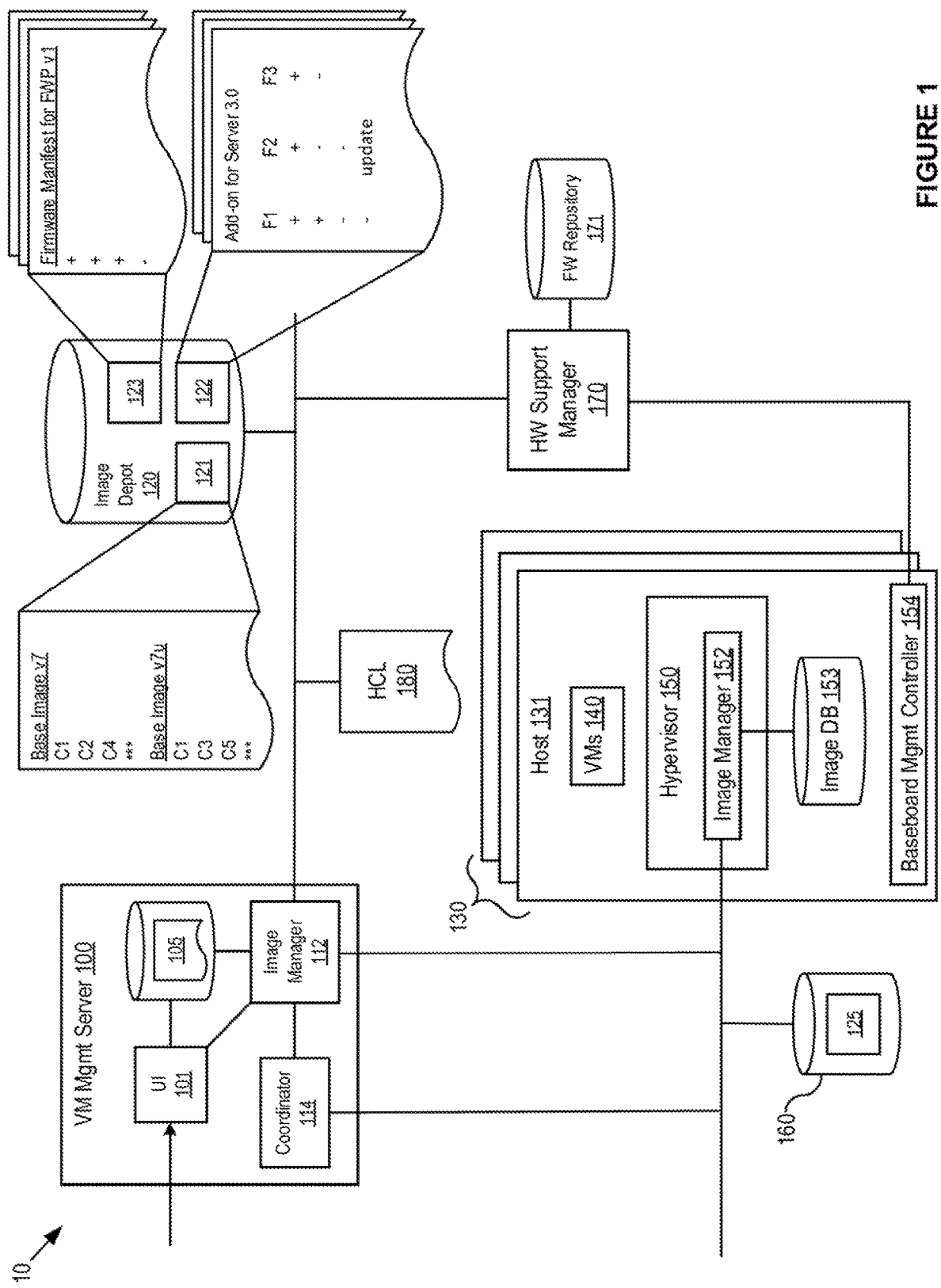
FIG. 1 is a block diagram of a virtualized computing system that implements a desired state model for managing the lifecycle of virtualization software according to embodiments.

FIG. 1 is a block diagram of a virtualized computing system 10 that implements a desired state model for managing the lifecycle of virtualization software according to embodiments. System 10 includes a cluster of hosts 131 which may be constructed on a server grade hardware platform such as an x86 architecture platform. The hardware platform includes one or more central processing units (CPUs), system memory, e.g., random access memory (RAM), and one or more network interface controllers (NICs). A virtualization software layer, also referred to herein as a hypervisor 150, is installed on top of the hardware platform. Hypervisor 150 supports a virtual machine execution space within which multiple VMs 140 may be concurrently instantiated and executed.

In the embodiment illustrated in FIG. 1, hosts 131 access shared storage 160 through their NICs. In another embodiment, each host 131 contains a host bus adapter (HBA) through which input/output operations (IOs) are sent to shared storage 160. Shared storage 160 may comprise, e.g., magnetic disks or flash memory in a storage area network (SAN). In some embodiments, hosts 131 also contain local storage devices (e.g., hard disk drives or solid-state drives), which may be aggregated and provisioned as a virtual SAN device.

VM management server 100 is a physical or virtual server that communicates with hypervisor 150 of each host 131 to provision VMs 140 from the hardware resources of host 131. VM management server 100 logically groups hosts 131 into a cluster 130 to provide cluster-level functions, such as load balancing across cluster 130 by performing VM migration between hosts 131, distributed power management, dynamic VM placement according to affinity and anti-affinity rules, and high-availability. The number of hosts 131 in the cluster may be one or many and three are depicted in FIG. 1.

In the desired state model according to embodiments, the end user expresses the desired state of the virtualization software (i.e., hypervisor 150) for the cluster of hosts through a UI 101 of VM management server 100. One example form for expressing the desired state is a software specification 105, which is generated based on selections made through UI 101. The selections that can be made through UI 101 include (1) base image, (2) add-on, (3) solution, (4) user component(s), and (5) firmware package (see FIG. 2). Image manager 112 consumes software specification 105 to composite a desired image that is modeled as a hierarchical software stack, including (1) the base image, which is the lowest layer of the software stack, (2) the add-on, which is layered on top of the base image, (3) firmware manifest corresponding to the selected firmware package in the layer above the add-on, and then on the top (4) solution drivers and agents and other user components.

In the embodiments, metadata and payloads of components, and metadata of base images, add-ons, firmware packages (in the form of a firmware manifest 123), components defined in firmware packages (hereinafter referred to a "firmware components"), and user components are placed in a data structure referred to as image depot 120. As depicted in FIG. 1, metadata 121 for base images include metadata for "Base Image v7," which include components, C1, C2, C4, etc. and metadata for "Base Image v7u," which include components, C1, C3, C5, etc. FIG. 1 also depicts metadata 122 for add-ons for a family of servers, F1, F2, and F3, where the "+" symbols represent components being added to the base image and the "−" symbols represent components being deleted from the base image, while "update" represents a component in the base image that is being updated. As shown in metadata 122, for each family of servers, there can be different components that are added to, deleted from, and/or updated in the base image. Thus, different add-ons can have different dependencies. Firmware manifest 123 specifies components that are to be added on top of the base image and the add-on (depicted with a + symbol in FIG. 1) and components that are to be removed from the base image and the add-on (depicted with a − symbol in FIG. 1), so that drivers, agents, and other software components corresponding to the selected firmware package become part of the image of the virtualization software. In alternative embodiments, separate depots, e.g., in the form of file servers, are set up by OEMs to store metadata and payloads of components that the OEMs publish.

Figure 4:
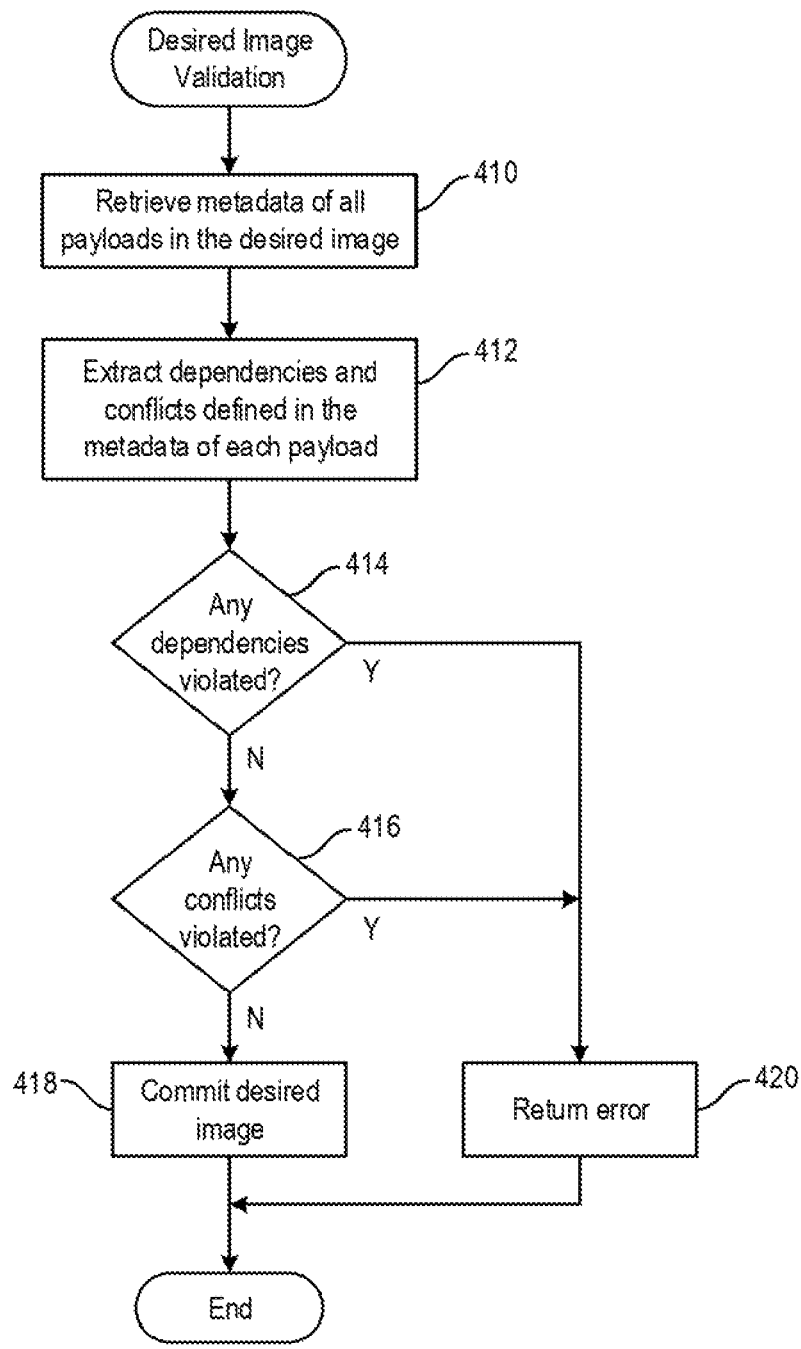
FIG. 4 is a flow diagram of steps carried out to perform validation of the desired image, according to an embodiment.

After image manager 112 composites the image of the virtualization software, image manager 112 validates the composited image in accordance with the method depicted in FIG. 4 and, if validated, stores the composited image in shared storage 160 as a desired image 125 that is to be installed in each host 131, and hands off control to coordinator 114. Coordinator 114 communicates with image manager 152 of each of hosts 131 through an API call to install desired image 125 in each of hosts 131. Once image manager 152 installs desired image 125, it stores the metadata of the installed image of the virtualization software in image database 153. Going forward, image database 153 of each host 131 operates as the single source of truth for the state of the virtualization software configured in that host, and will record any changes to the state of the virtualization software in image database 153.

Coordinator 114 also communicates with a hardware support manager 170 through an API call to install the firmware in hosts 131. In response to the API call, hardware support manager 170 retrieves the firmware from firmware repository 171 and stages the firmware in hosts 131. Then, the firmware staged in each host 131 is installed in the host by a corresponding baseboard management controller 154.

Hardware support manager 170 is a firmware management software running in a physical or a virtual server that exposes various APIs. The APIs include: (1) an "apply/remediate" API call to install in hosts 131 the firmware specified by the firmware manifest in desired image 125 or to remediate the firmware currently installed in hosts 131 to bring the firmware into compliance, (2) a "list" API to list all of the firmware packages that hardware support manager 170 is supporting, (3) a "scan" API to compare the current state of the firmware running in hosts 131 with the firmware specified by the firmware manifest in desired image 125, (4) a "firmware inventory" API to report a current state of the firmware running in hosts 131, (5) a "pre-check" API to confirm that it is possible to upgrade the firmware currently installed in hosts 131 to the firmware specified by the firmware manifest in desired image 125, and (6) a "stage" API to retrieve the firmware specified by the firmware manifest in desired image 125 and store them in a cache memory of hosts 131 for immediate installation upon receiving an apply or remediate API call. With these APIs, the end user is able to manage the image of the virtualization software installed in hosts 131 and the firmware installed in hosts 131 from a single "pane of glass," in this case, through UI 101 of VM management server 100.

Before desired image 125 is actually installed in hosts 131, image manager 112 performs a validation against a hardware compatibility list (HCL) 180. The goal of this validation, more specifically referred to herein as an HCL validation, is to make sure that desired image 125 which is going to be deployed in hosts 131 is compatible with the hardware devices in hosts 131. HCL 180 contains a list of all hardware devices installed in hosts 131, and identifies for each such hardware device all versions of device firmware and drivers that are compatible therewith. Validation is successful if the versions of the firmware and drivers in desired image 125 are listed in HCL 180 as compatible versions.

Figure 2:
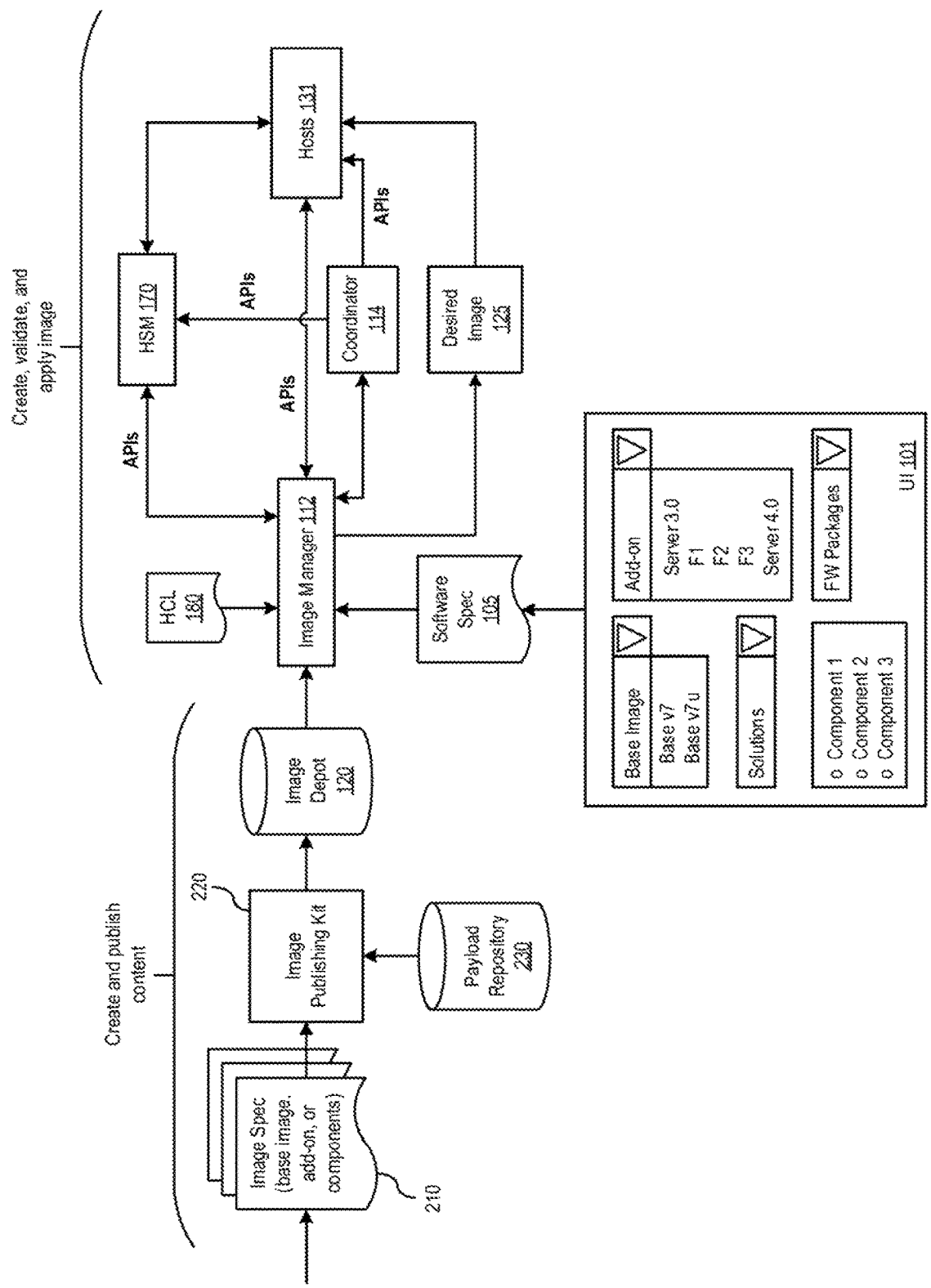
FIG. 2 is a conceptual diagram that illustrates a flow of steps carried out by different components of the virtualized computing system to create and apply a desired image of the virtualization software, according to embodiments.

FIG. 2 is a conceptual diagram that illustrates a flow of steps carried out by different components of the virtualized computing system to create and apply a desired image of the virtualization software, according to embodiments. The first part of FIG. 2 depicts steps for creating content and publishing them in image depot 120. Typically, the creator of the base image is the provider of the virtualization software, e.g., VMware, Inc., and the creator of the add-on is the OEM, which is the provider of the physical servers that are configured as hosts 131. The creator of components may be the provider of the virtualization software, the OEM, or another software developer (e.g., in the case of user components).

Components are defined in an image specification 210 as a collection of payloads, which are stored in payload repository 230, and an image publishing kit 220 pulls in the payloads of the components from payload repository 230 and publishes them in image depot 120 along with the metadata of the published components. Components published in this manner may be a component of a base image, a component of an add-on, a firmware component, a component required to implement a solution, or a user component.

The provider of the virtualization software defines the components that make up the base image in an image specification 210, and image publishing kit 220 publishes the metadata of the base image in image depot 120. In the example depicted in FIG. 1, the metadata of the base image for "Base v7" and the metadata of the base image for "Base v7u" are published in image depot 120.

OEMs define the content of their add-ons in image specifications 210, and image publishing kit 220 publishes the metadata of the add-ons in image depot 120. In the example depicted in FIG. 1, the metadata of add-ons for a family of servers (e.g., F1, F2, and F3 of Server 3.0) are published in image depot 120. OEMs also define the content of firmware components, and image publishing kit 220 publishes the metadata of these components in image depot 120. OEMs also define the content of their firmware packages, in the form of a firmware manifest.

Different solutions and user components are also defined in image specifications 210, and image publishing kit 220 publishes the metadata of each of the different solutions and user components in image depot 120.

The second part of FIG. 2 depicts steps for creating, validating, and applying the desired image. After payloads and metadata of base images, add-ons, firmware components, solutions, and user components have been published in image depot 120, the end user is able to define software specification 105 for the desired image of the virtualization software through UI 101. UI 101 includes different sections for selecting a base image, add-on, solution, firmware package, and one or more user components. Software specification 105 is generated based on the selections the end user makes through UI 101.

After software specification 105 is generated, image manager 112 parses it to determine the selections of the base image, add-on, solution, firmware package, and one or more user components made by the end user. Then, image manager 112 retrieves the metadata corresponding to the selected base image, the selected add-on, and the selected solution from image depot 120, determines the firmware manifest corresponding to the selected firmware package, and composites an image of the virtualization software as a hierarchical software stack, as described above. Image manager 112 then validates the composited image as described below in conjunction with FIG. 4, and commits the validated composited image of the virtualization software as desired image 125 in shared storage 160.

Figure 3:
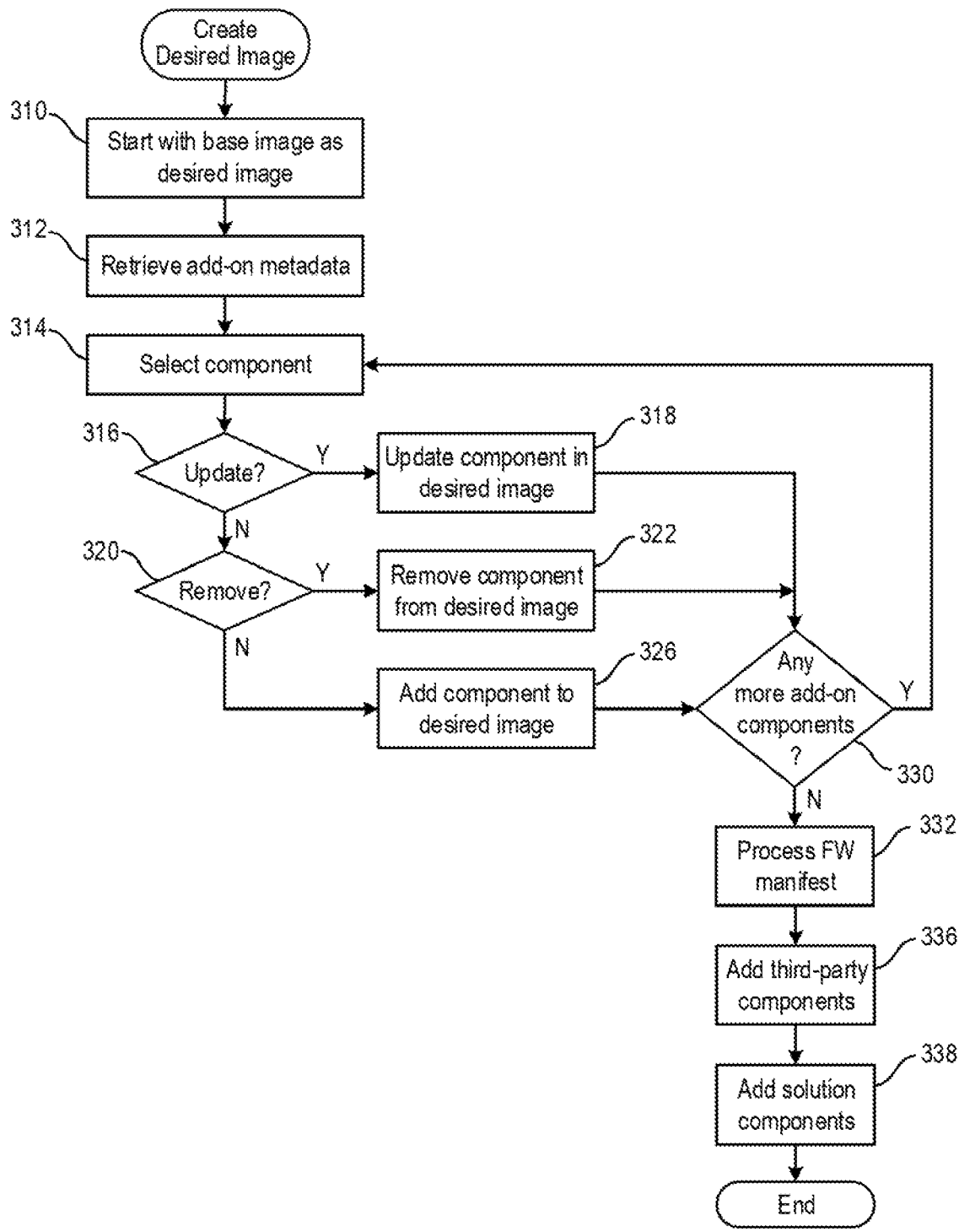
FIG. 3 is a flow diagram of steps carried out to create the desired image of the virtualization software, according to an embodiment.

FIG. 3 is a flow diagram of steps carried out by image manager 112 to create the desired image of the virtualization software, according to an embodiment. The method of FIG. 3 begins at step 310, where image manager 310 starts with the metadata of the selected base image as the desired image. Then, at step 312, image manager 310 retrieves the metadata of the selected add-on and parses the metadata of the selected add-on for components.

At step 314, image manager 112 selects a component to process. If the component is to be updated as determined at step 316, image manager 112 updates the metadata of the component in the desired image at step 318. If the component is to be removed as determined at step 320, image manager 112 removes the metadata of the component from the desired image at step 322. If the component is to be neither updated nor removed, it is added to the desired image at step 326. If there are any more add-on components to process, as determined at step 330, the process returns to step 314, where another component is selected for processing.

If there are no more add-on components to process, as determined at step 330, image manager 112 at step 332 processes the firmware manifest corresponding to the selected firmware package to add and remove components in the same manner as the selected add-on was processed. Then, image manager 112 adds to the desired image and one or more user components selected by the user at step 336 and components for the selected solution at step 338.

FIG. 4 is a flow diagram of steps carried out by image manager 112 to perform validation of the desired image, according to an embodiment. The method of FIG. 4 begins at step 410 at which image manager 112 retrieves metadata of all payloads in the desired image. Then, at step 412, image manager 112 parses the retrieved metadata to extract all dependencies and conflicts defined therein. Image manager 112 executes steps 414 and 416 to determine if any dependencies or conflicts are violated by the payloads that make up the desired image. If there are no such violations, the desired image is committed at step 418 as stored in shared storage 160 as desired image 125. On the other hand, if there is any violation, an error is returned at step 420.

Figure 5:
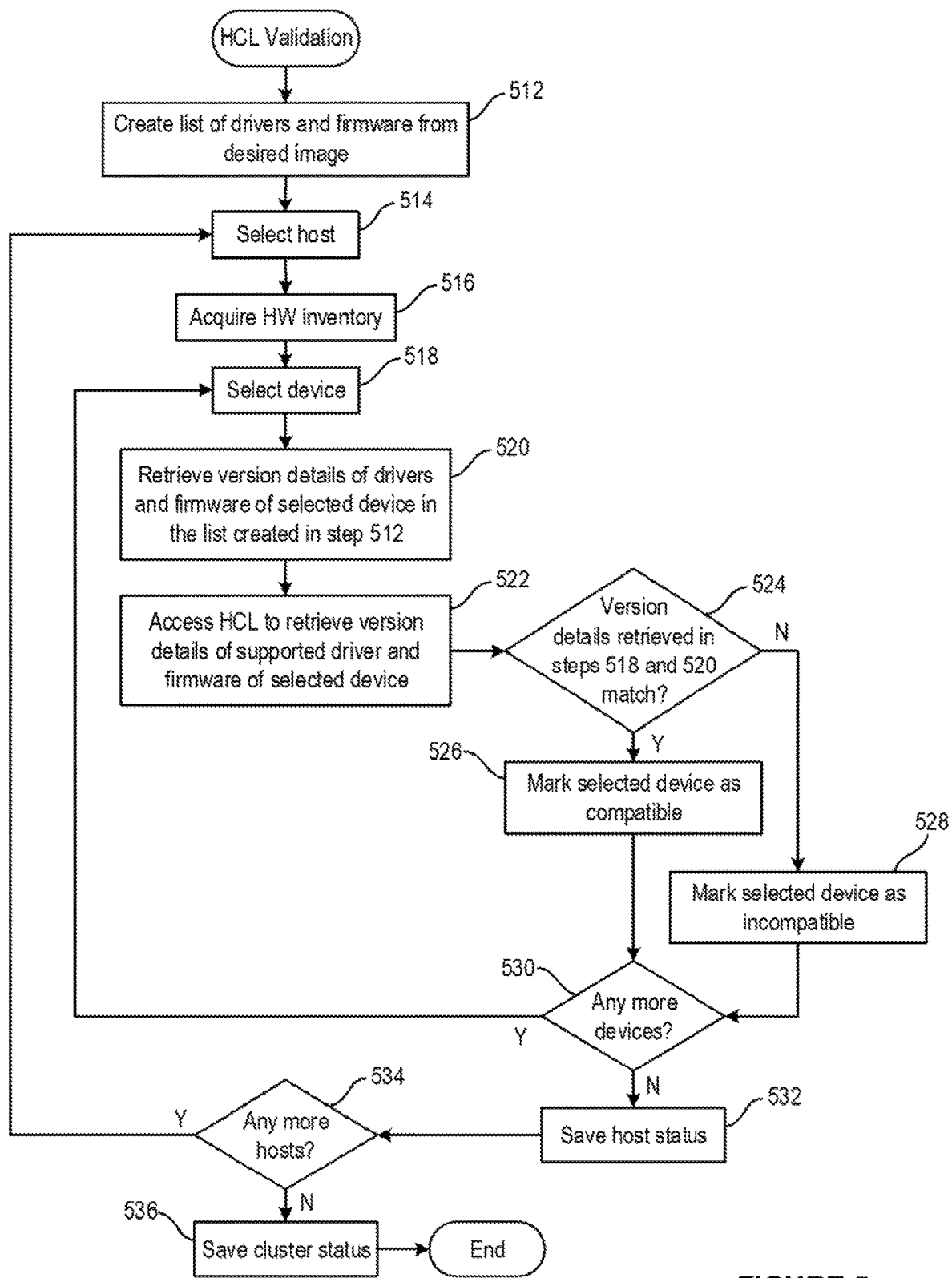
FIG. 5 is a flow diagram of steps carried out to perform validation against a hardware compatibility list, according to an embodiment.

FIG. 5 is a flow diagram of steps carried out by image manager 112 to perform validation of the desired image of the virtualization software against HCL 180, according to an embodiment. The method of FIG. 5 begins at step 512 at which image manager 112 creates a list of firmware and drivers that are in desired image 125, along with their version numbers. At step 514, image manager 112 selects a host against which HCL validation is performed. Steps 516, 518, 520, 522, 524, 526, 528, 530, 532, and 534 are executed each time a new host is selected at step 514.

At step 516, image manager 112 acquires the hardware inventory of the host, e.g., from a hardware discovery service that is running in VM management server 100. Then, at step 518, image manager 112 selects a unique device in the hardware inventory. Steps 520, 522, 524, 526, 528, and 530 are executed each time a new unique device is selected at step 518. At step 520, image manager 112 retrieves version details of drivers and firmware of the selected device in the list created at step 512. Then, at step 522, image manager 112 accesses HCL 180 to retrieve version details of supported driver and firmware of the selected device. The version details of the drivers and firmware retrieved at step 520 and the version details of the drivers and firmware retrieved at step 522 are then compared at step 524. If there is a match, i.e., the version details of the drivers and firmware retrieved at step 520 can be found in the version details of the drivers and firmware retrieved at step 522, the selected device is marked as compatible at step 526. On the other hand, if there is no match, i.e., the version details of the drivers and firmware retrieved at step 520 cannot be found in the version details of the drivers and firmware retrieved at step 522, the selected device is marked as incompatible at step 528.

If it is determined at step 530 that there is another unique device in the hardware inventory, the process returns to step 518, where image manager 112 selects the next unique device in the hardware inventory. If it is determined at step 530 that there is no other unique device in the hardware inventory, the process proceeds to step 532, at which image manager 112 saves the status for the selected host. If any of the devices were marked as incompatible at step 528, the selected host is marked as incompatible at step 532. If all of the devices were marked as compatible at step 528, the selected host is marked as compatible at step 532.

At step 532, if it is determined that HCL validation has not been carried out for all of hosts 131, the process returns to step 514, where image manager 112 selects the next host for HCL validation. If not, the process proceeds to step 536, at which image manager reads the status of all the hosts in the cluster and saves the status for the entire cluster. If any of the hosts of the cluster were marked as incompatible at step 532, the cluster is marked as incompatible at step 536. If all of the hosts of the cluster were marked as compatible at step 532, the cluster is marked as compatible at step 536. After step 536, the process ends.

Figure 6:
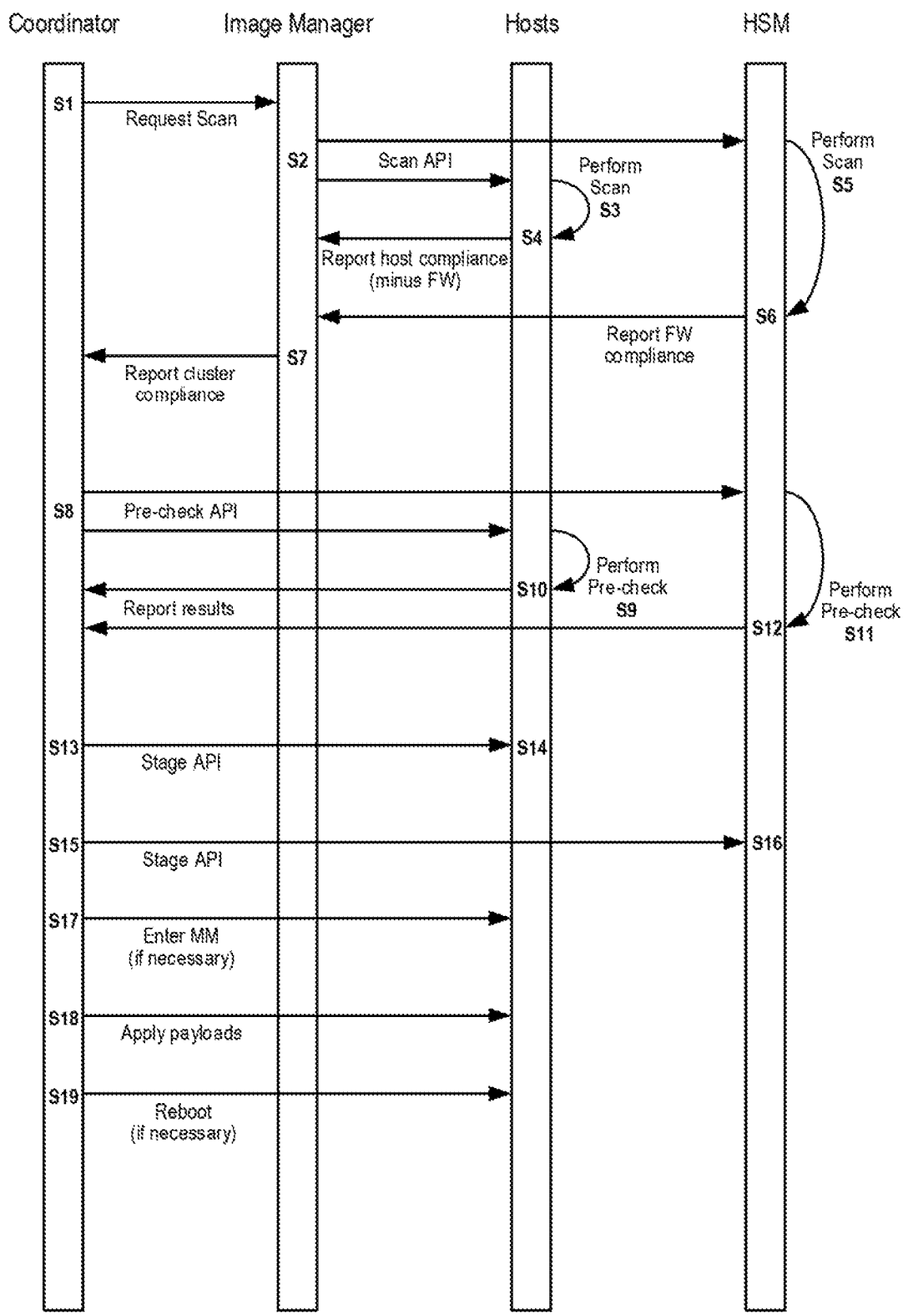
FIG. 6 is a command sequence diagram that depicts a process for applying the desired image of the virtualization software to hosts of the virtualized computing system.

After desired image 125 is validated, committed, and stored in shared storage 160 and after it passes HCL validation, desired image 125 can be applied to hosts 131. Referring back to FIG. 2, image manager 112 transfers control for applying desired image 125 to coordinator 114. The process for applying desired image 125 is depicted in FIG. 6. FIG. 6 is a command sequence diagram that depicts a process for applying the desired image of the virtualization software to hosts of the virtualized computing system. The process includes the following subprocesses: (1) scan, (2) pre-check, (3) stage, and (4) apply.

The scan subprocess is represented by steps S1 to S7. Coordinator 114 initiates the scan subprocess by making the request to image manager 112 at step S1. In response, image manager 112 at step S2 issues a scan API to image manager 152 of each host 131 and a scan API to hardware support manager 170. The scan API includes a storage location of desired image 125.

In response to the scan API, image manager 152 at step S3, accesses desired image 125 and retrieves the current state of the virtualization software from image database 153, and compares the two to determine if each item of desired image 125 other than the firmware manifest is "incompatible" (which means that desired image 125 cannot be applied, e.g., when the current state is running a higher version of an item), "compliant" (which means that the current state matches the desired state), non-compliant (which means that the current state can be upgraded to the desired state), or unknown (which means that a comparison of the current state could not be made with the item in desired image 125 because the item in desired image 125 is unknown or not recognizable). At step S4, image manager 152 of each host 131 sends back a compliance report indicating one of four aforementioned compliance states, and for each item that is non-compliant, also reports on the impact on the host to which desired image 125 will be applied, i.e., whether the host needs to enter into a maintenance mode or needs to be rebooted.

In response to the scan API, hardware support manager 170 at step S5, accesses desired image 125 to extract the firmware manifest in desired image 125, and for each host 131, determines whether or not the firmware specified by the firmware manifest is incompatible, compliant, non-compliant, or unknown with respect to the firmware currently installed in each host 131. At step S6, hardware support manager 170 prepares a firmware compliance report per host, and sends back the firmware compliance report per host to image manager 112. The firmware compliance report per host indicates "incompatible" if the host has installed therein firmware that is of a higher version that that specified by the firmware manifest, "compliant" if the host has installed therein the firmware specified by the firmware manifest, "non-compliant" if the host has installed therein firmware that is of a lower version than that specified by the firmware manifest, or "unknown" if the firmware manifest specifies firmware that is either unknown or not recognizable. If the compliance state is "non-compliant" for any host, the firmware compliance report for that host also indicates the impact on the host, i.e., whether the host needs to enter into a maintenance mode or needs to be rebooted. In cases where hardware support manager 170 supports downgrading of the firmware, the firmware compliance report will indicate "non-compliant" instead of "incompatible" if the host has installed therein firmware that is of a higher version that that specified by the firmware manifest.

Upon receipt of the compliance reports, image manager 112 prepares a per-host compliance report based on the compliance report sent from the host at step S4 and firmware compliance reports sent from hardware support manager 170 at step S6. Then, image manager 112 generates a cluster level compliance report based on all of the per-host compliance reports from hosts 131 and the firmware compliance reports sent from hardware support manager 170. At step S7, image manager 112 sends back both the per-host compliance report (which also indicates the impact on the host), and the cluster level compliance report to coordinator 114.

The pre-check subprocess is represented by steps S8 to S12. Coordinator 114 at step S8 issues a pre-check API to image manager 152 of each host 131 and to hardware support manager 170. In response to the pre-check API, image manager 152 of each host 131 at step S9 accesses desired image 125 and retrieves the current state of the virtualization software from image database 153, and compares the two to determine whether or not the virtualization software in the host is compliant or can be upgraded to desired image 125 at that time, and performs several other checks on the host and at step S10 sends the results of the checks to coordinator 114. The other checks include whether or not the host can enter into maintenance mode at that time and a check on the operational health of the host. Similarly, in response to the pre-check API, hardware support manager 170 at step S11 performs a check on each host 131 to determine whether or not the firmware in the host is compliant or can be upgraded to the firmware specified by the firmware manifest in desired image 125 at that time, and at step S12 sends the results of this check to coordinator 114. A pre-check might fail for firmware if higher versions of firmware are already installed, or if the combination of drivers in the image and the firmware specified by the firmware manifest would be incompatible (e.g. if the end user overrode a component in a way that is incompatible with the firmware specified by the firmware manifest). There may also be hardware-specific reasons the firmware specified by the firmware manifest cannot be applied (e.g., defects in system that need repair, lack of resources for the firmware in baseboard management controller 154, etc.)

Coordinator 114 determines whether or not to proceed with the application of desired image 125 to hosts 131 based on the results of the pre-check. For example, if the operational health of one of the hosts 131 is bad, coordinator 114 will not proceed with the application of desired image 125 to hosts 131. Upon determining to proceed with the application of desired image 125 to hosts 131, coordinator 114 executes the stage subprocess.

The stage subprocess is represented by steps S13 to S16. Coordinator 114 at step S13 issues a stage API to image manager 152 of each host 131, and at step S15 issues a stage API to hardware support manager 170. In response, image manager 152 at step S14 pulls in the payloads of desired image 125 from the storage location of desired image 125 and caches them in local memory or cache of the host. At step S16, hardware support manager 170 pulls in payloads of the firmware specified by the firmware manifest in desired image 125 from firmware repository 171 and caches them in local memory or cache of the host.

After staging the payloads, coordinator 114 at step S17 instructs each host 131 to enter into maintenance mode if the cluster compliance report indicates that the maintenance mode is required to bring hosts 131 into compliance. In response to such an instruction (if issued), hosts 131 enter into maintenance mode.

The apply subprocess follows step S17. This subprocess is represented by S18. At step S18, coordinator 114 issues an apply API to each host 131. This API causes image manager 152 of each host 131 to update the current state of the virtualization software with the payloads of desired image 125 staged at step S14 and the payloads of the firmware staged at step S16. Also, at step S18, image manager 152 updates metadata of the virtualization software that is stored in image database 153 to reflect that the virtualization software in the host and the associated firmware have been updated to be compliant with desired image 125.

At step S19, coordinator 114 instructs each host 131 to reboot if the cluster compliance report indicates that hosts 131 are required to be rebooted to bring the virtualization software in the host and the associated firmware into compliance. In response to such an instruction (if issued), hosts 131 undergo a reboot.

In the embodiments, the end user carries out the process of FIG. 6 to "remediate" hosts 131. The remediation process may be executed, in one embodiment, to bring the cluster of hosts 131 back into compliance with the desired state of the virtualization software specified in software specification 105. In another embodiment, the process is carried out to deliver and install a new desired image of the virtualization software that is generated from software specification 105. The process of FIG. 6 includes the scan subprocess, the pre-check subprocess, the stage subprocess, and the apply subprocess, but some of the subprocesses, e.g., the scan subprocess and the pre-check subprocess, may be executed on its own, independently of the process of FIG. 6.

Figure 7:
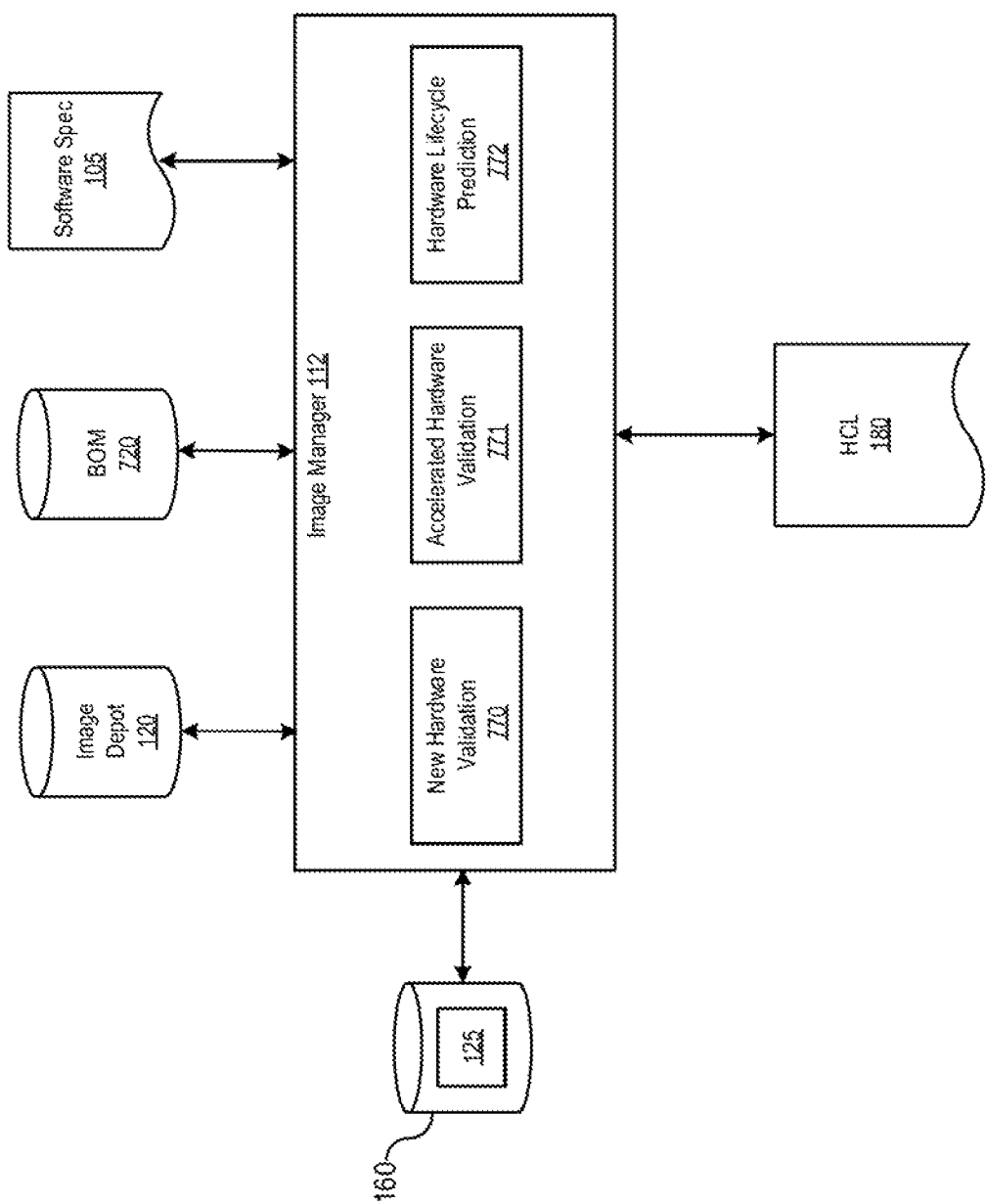
FIG. 7 is a block diagram of an image manager communicating with various components of the virtualized computing system to perform new hardware validation, accelerated hardware validation, and hardware lifecycle prediction.
Figure 8:
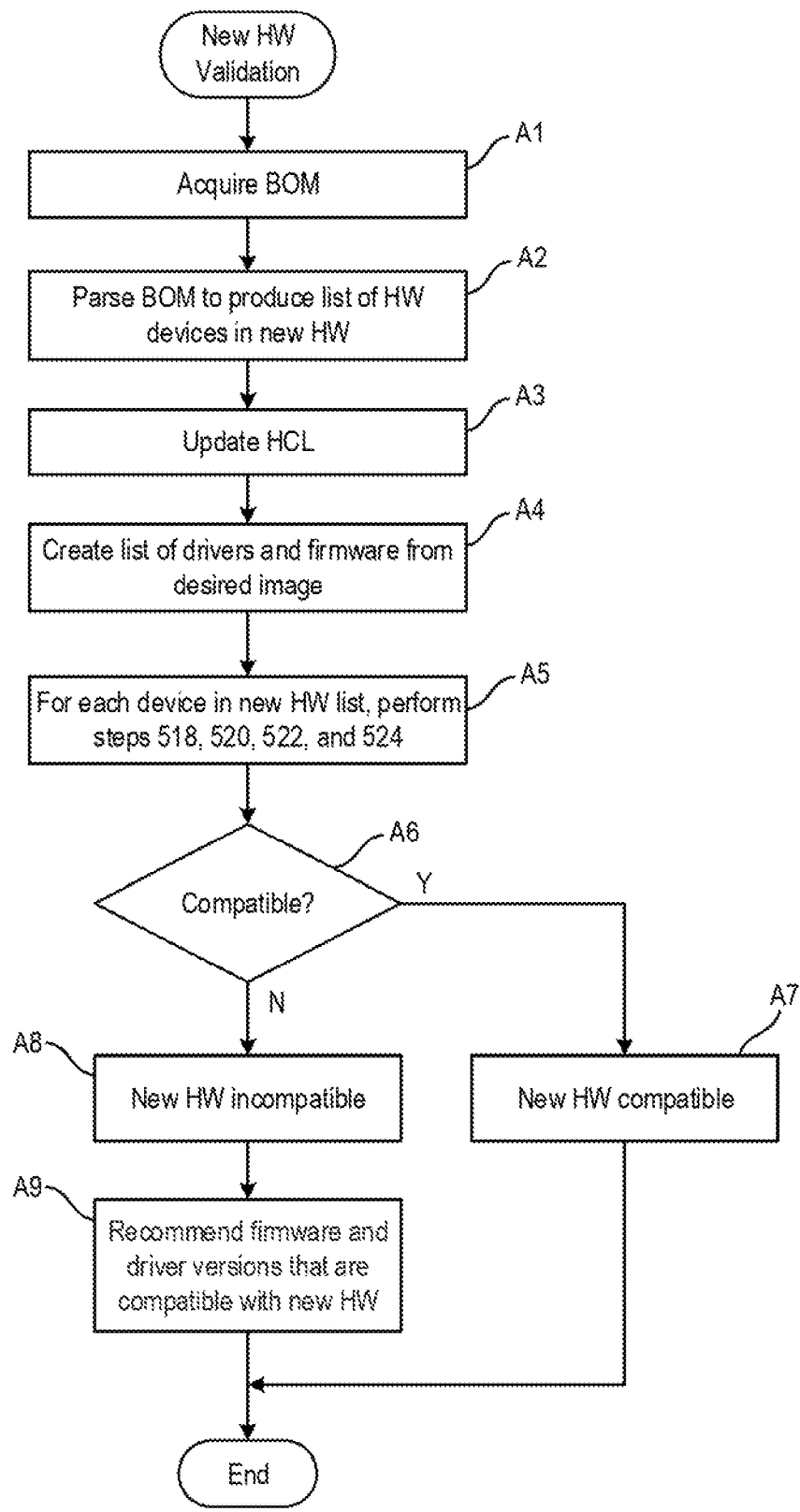
FIG. 8 is a flow diagram illustrating steps of new hardware validation.
Figure 9:
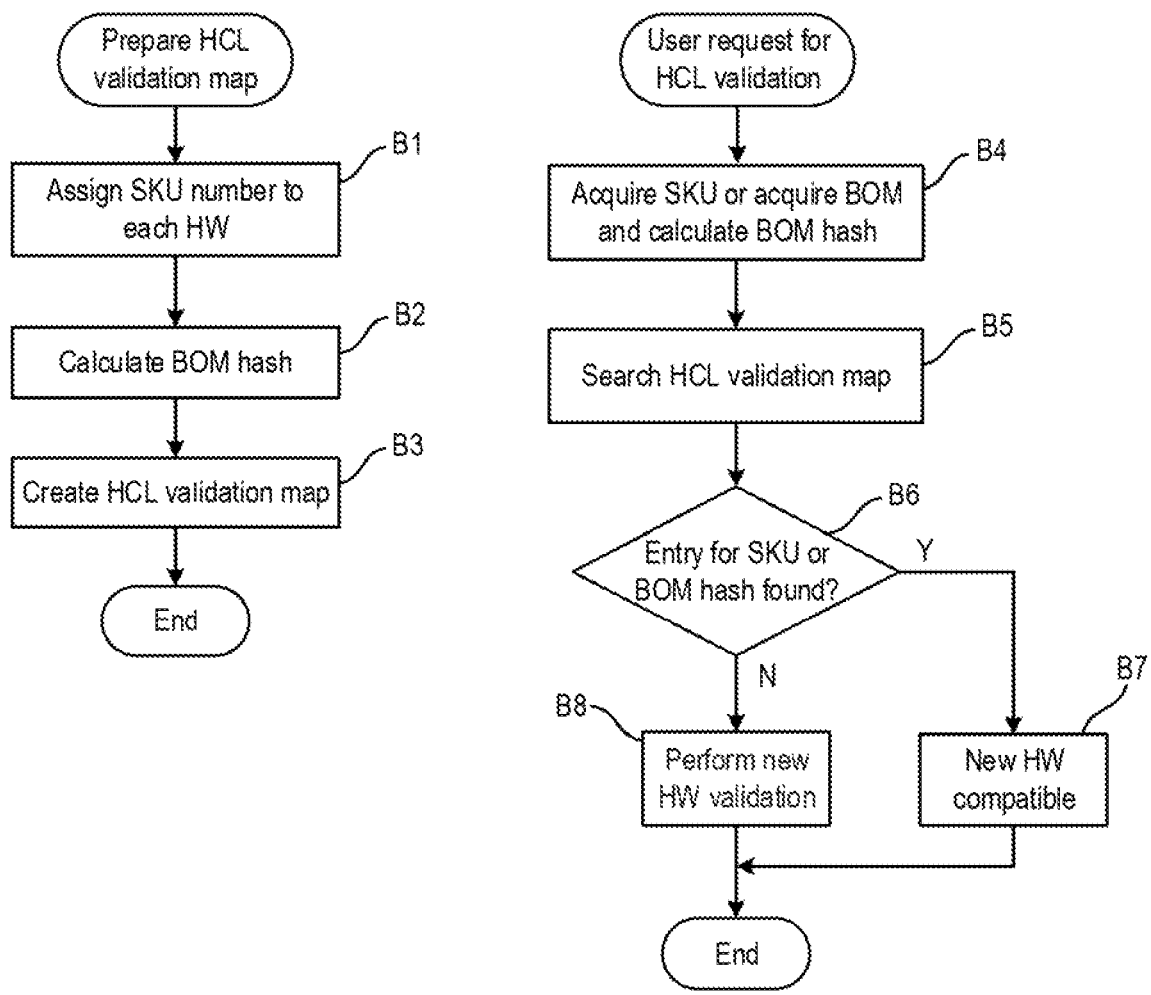
FIG. 9 is a flow diagram illustrating steps of accelerated hardware validation.
Figure 10:
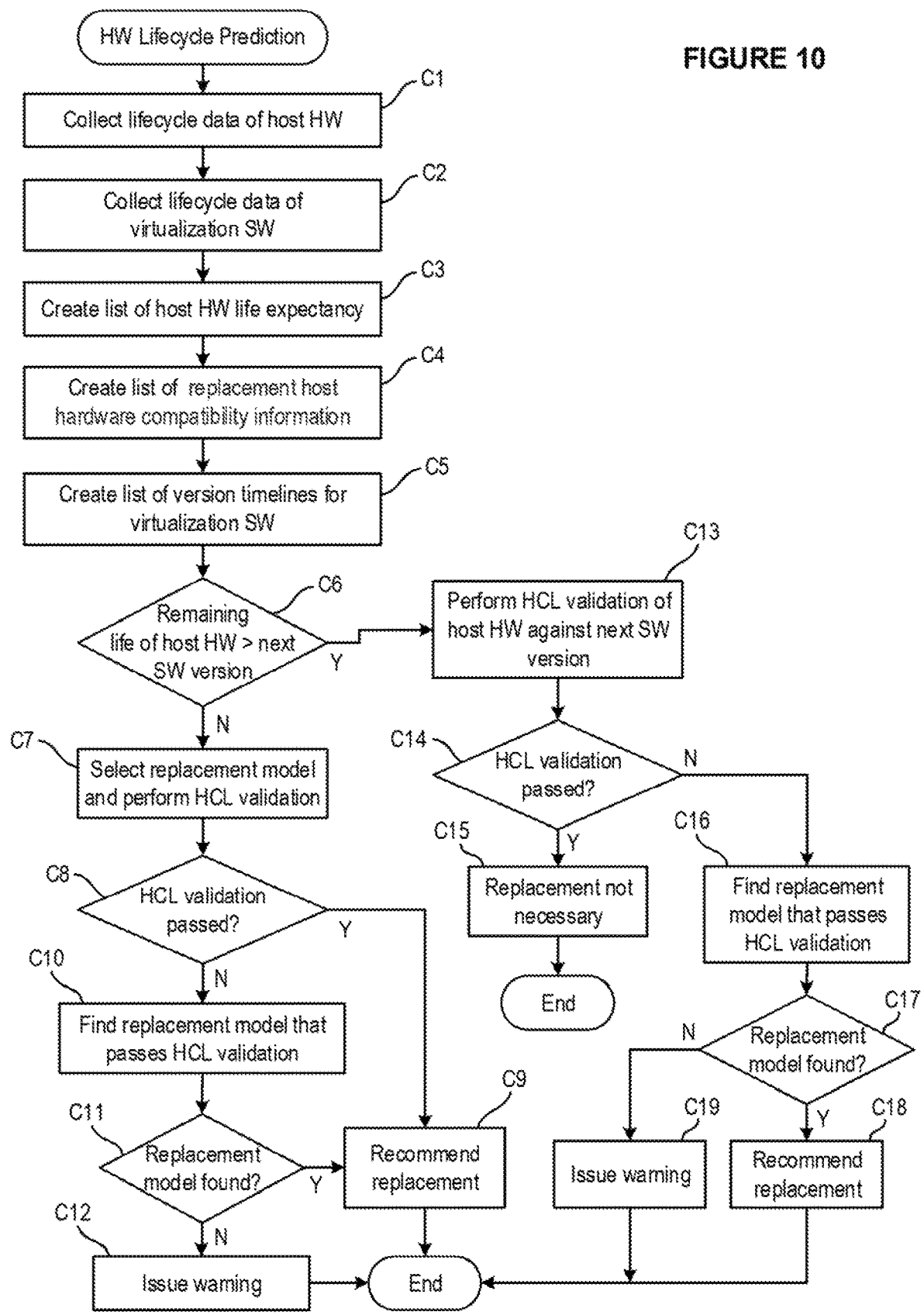
FIG. 10 is a flow diagram illustrating steps of hardware lifecycle prediction.

FIG. 7 is a block diagram of an image manager communicating with various components of the virtualized computing system to perform new hardware validation 770, accelerated hardware validation 771, and hardware lifecycle prediction 772. As explained above, before a desired image of virtualization software is installed in a host of a cluster, image manger 112 performs a validation against a hardware compatibility list (HCL) 180. The HCL 180 contains a list of all hardware devices installed in a host and identifies for each such hardware device all versions of device firmware and drivers that are compatible therewith. Validation for a host is successful if the versions of the firmware and drivers in the desired image are listed in HCL 180 as compatible versions.

When a host in a cluster is upgraded or replaced with new hardware, a vendor or OEM of the new hardware provides a bill of materials (BOM) that gives a comprehensive list of parts of the new hardware, including those that require firmware and driver. BOMs for new hardware are collected and stored in BOM database 720. Each hardware device listed in a BOM may already be in HCL 180 and, if not, is added to HCL 180 with an identification of all versions of firmware and drivers that are compatible therewith.

To determine if a host in a cluster can be upgraded or replaced with new hardware, image manager 112 performs new hardware validation 770 to determine whether new hardware would be compatible with a desired image of virtualization software. The process for new hardware validation 770 includes steps A1 through A9.

At step A1, the BOM for the new hardware is acquired from the hardware vendor and stored in BOM database 720. At step A2, image manager 112 parses the BOM to produce a list of hardware devices that are in the new hardware. If a listed hardware device is not in HCL 180, image manager 112 adds the hardware device to update HCL 180 and associates the added hardware device to firmware and driver versions that are compatible therewith (step A3). At step A4, image manager 112 creates a list of firmware and drivers, along with version numbers, in the desired image of the virtualization software (e.g., desired image 125) that will be installed in the new hardware. At step A5, image manager 112 performs steps 518, 520, 522, and 524 of FIG. 5 for each hardware device in the new hardware list (produced at step A2) to determine if the desired image of the virtualization software contains firmware and driver versions that are compatible with the new hardware device. If compatibility is found with all of the hardware devices in the new hardware list (step A6, yes), image manger 112 determines the new hardware to be compatible (step A7). If not (step A6, no), image manger 112 determines the new hardware to be incompatible (step A8), and additionally, provides recommendations of firmware and driver versions that are compatible with the new hardware (step A9).

The process including steps A1 through A9 is repeated for each new hardware model, and results of the HCL validation for each new hardware model is stored in BOM database 720. The process for accelerated hardware validation 771 includes steps B1 through B3, which are carried out to prepare an HCL validation map, and steps B4 through B8, which are carried out to perform HCL validation.

At step B1, image manager 112 assigns a stock keeping unit (SKU) number to each hardware model in BOM database 720. The SKU number may be provided by the vendor or OEM of the hardware model, and is a number that is typically used to track movement of inventory. At step B2, image manager 112 calculates a hash for each hardware model from the BOM. At step B3, image manager 112 creates an HCL validation map having a plurality of entries (one entry per hardware model), where each entry includes <SKU, BOM hash, HCL validation result>.

Step B4 is triggered in response to a user request for HCL validation of a hardware model. At step B4, image manager 112 acquires an SKU and, if the SKU is not available, acquires a BOM of the hardware model and calculates a hash of the BOM. At step B5, image manager 112 searches the HCL validation map for an entry that has the SKU or the BOM hash. If an entry is found (step B6, yes), image manager 112 determines the hardware to be compatible (step B7). If an entry is not found (step B6, no), image manager 112 performs new hardware validation 770 as described above (step B8).

Each host in a cluster includes hardware that has a finite lifecycle and is installed with a desired image of the virtualization of software also having a finite lifecycle. Image manager 112 performs hardware lifecycle prediction 772 to predict when to notify a customer that the host hardware should be replaced in view of the host hardware's compatibility with future versions of the virtualization software. The process for hardware lifecycle prediction 772 includes steps C1 through C19.

At step C1, image manager 112 collects lifecycle metadata for each host hardware in the cluster. The hardware lifecycle metadata includes (a) life expectancy of the host hardware (e.g., 1-year remaining life, 2-year remaining life and so on), (b) list of hardware devices installed in the host hardware, (c) replacement model timeline for the host hardware (e.g., model B of host hardware replaces model A of host hardware in 2021), and a (d) list of hardware devices in the replacement model.

At step C2, image manager 112 collects software lifecycle metadata of the current version of the virtualization software (e.g., desired image 125). Software lifecycle metadata includes (a) a list of software components such as the firmware and drivers in the current version of the virtualization software, (b) life expectancy for support of the current version of the virtualization software (e.g., current version 7.0 life expectancy is 1 year), and (c) replacement timeline for the current version of the virtualization software (e.g., version 7.1 is to replace version 7.0 in 2020, version 8.0 is to replace 7.1 in 2021, and so on).

At step C3, based on the life expectancy of the hardware lifecycle metadata collected in step C1, image manager 112 creates a list of hardware lifecycle expectancy for each host hardware in the cluster (e.g., Host Hardware 1: 1 year; Host Hardware 2: 4 years; and so on). At step C4, image manager 112 creates a list of replacement host hardware compatibility information for each host hardware (e.g., Host Hardware 1: DELL® R730 can be replaced with DELL® R740; Host Hardware 2: HP® ML350 can be replaced with HP® ML 370; and so on). At step C5, image manager 112 creates a list of version timelines for the virtualization software, e.g., (Ver. 7.0: 2019; Ver. 2.1: 2020; Ver. 8.0: 2021; Ver. 8.5: 2022; Ver. 9.0: 2023 and so on).

Steps C6 through C10 are carried out for each host hardware in the cluster. In step C6, image manager 112 checks the remaining life of the host hardware to see if it extends past the next version release date of the virtualization software. If the remaining life of the host hardware does not extend past the next version release date of the virtualization software (step C6, no), image manager 112 selects a replacement model (e.g., Host Hardware B) and performs HCL validation of the hardware devices in the replacement model against software components of the next version of virtualization software by performing new hardware validation 770 described above (step C7). If HCL validation passes (C8, yes), image manager 112 at step C9 notifies the cluster administrator to recommend replacing the current host hardware with Hardware B. If HCL validation fails (step C8, no), image manager 112 repeatedly selects a replacement model from the list created at step C4 and performs HCL validation against software components of the next version of virtualization software until HCL validation passes (step C10). If a replacement model that is compatible with software components of the next version of virtualization software can be found (step C11, yes), image manager at step C9 recommends replacing the current host hardware with that replacement model. Otherwise (step C11, no), image manager 112 at step C12 issues a warning showing the remaining life of the host hardware and that none of the replacement models will be compatible with software components of the next version of virtualization software.

If the remaining life of the host hardware extends past the next version release date of the virtualization software (step C6, yes), image manager 112 performs HCL validation of the host hardware against software components of the next version of virtualization software (step C13). If HCL validation passes (C14, yes), there is no need to replace the current host hardware and so image manager 112 notifies the cluster administrator that replacement of the host hardware is not necessary (step C15). On the other hand, if HCL validation fails (C14, no), image manager 112 repeatedly selects a replacement model from the list created at step C4 and performs HCL validation against software components of the next version of virtualization software until HCL validation passes (step C16). If a replacement model that is compatible with software components of the next version of virtualization software can be found (step C17, yes), image manager at step C18 recommends replacing the host hardware with that replacement model at the end of life of the current host hardware. Otherwise (step C17, no), image manager at step C19 issues a warning showing the remaining life of the host hardware and that none of the replacement models will be compatible with software components of the next version of virtualization software.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of validating a desired image of a virtualization software and a firmware package to be installed in a plurality of hosts, said method comprising:
  acquiring hardware inventory of each of the hosts to determine hardware devices installed in the hosts;
  for each of the hardware devices, searching for firmware and driver thereof in a hardware compatibility list (HCL);
  for each driver included in the desired image of the virtualization software, that corresponds to one of the hardware devices, determining whether or not the driver is compatible according to the hardware compatibility list;
  for each firmware included in the firmware package, that corresponds to one of the hardware devices, determining whether or not the firmware is compatible according to the hardware compatibility list; and validating the desired image of the virtualization software and the firmware package to be installed in the hosts if each of the hardware device has a compatible driver and a compatible firmware in the desired image of the virtualization software and the firmware package.

2. The method of claim 1, further comprising:

in response to a user input, generating a software specification that specifies the desired image of the virtualization software and a desired version of the firmware package.

3. The method of claim 1, wherein the HCL is implemented in a physical or virtual server running a verification service that performs the searching.

4. The method of claim 1, wherein a driver included in the desired image is a compatible driver if a version of the driver is listed in the HCL, and a firmware included in the firmware package is a compatible firmware if a version of the firmware is listed in the HCL.

5. The method of claim 1, wherein each of the hosts includes a hardware discovery service by which the hardware inventory thereof is acquired.

6. A non-transitory computer readable medium comprising instructions that are executable in a processor for the processor to carry out a method of validating a desired image of a virtualization software and a firmware package to be installed in a plurality of hosts, said method comprising:

acquiring hardware inventory of each of the hosts to determine hardware devices installed in the hosts;

for each of the hardware devices, searching for firmware and driver thereof in a hardware compatibility list (HCL);

for each driver included in the desired image of the virtualization software, that corresponds to one of the hardware devices, determining whether or not the driver is compatible according to the hardware compatibility list;

for each firmware included in the firmware package, that corresponds to one of the hardware devices, determining whether or not the firmware is compatible according to the hardware compatibility list; and validating the desired image of the virtualization software and the firmware package to be installed in the hosts if each of the hardware device has a compatible driver and a compatible firmware in the desired image of the virtualization software and the firmware package.

7. The non-transitory computer readable medium of claim 6, wherein the method further comprises:

in response to a user input, generating a software specification that specifies the desired image of the virtualization software and a desired version of the firmware package.

8. The non-transitory computer readable medium of claim 6, wherein the HCL is implemented in a physical or virtual server running a verification service that performs the searching.

9. The non-transitory computer readable medium of claim 6, wherein a driver included in the desired image is a compatible driver if a version of the driver is listed in the HCL, and a firmware included in the firmware package is a compatible firmware if a version of the firmware is listed in the HCL.

10. The non-transitory computer readable medium of claim 6, wherein each of the hosts includes a hardware discovery service by which the hardware inventory thereof is acquired.

11. A computer system comprising a management server and a cluster of hosts in which virtualization software and firmware are to be installed or upgraded, wherein the management server includes a processor that is programmed to execute a method of validating a desired image of the virtualization software and a firmware package to be installed in the cluster of hosts, said method comprising:

acquiring hardware inventory of each of the hosts to determine hardware devices installed in the hosts;

for each of the hardware devices, searching for firmware and driver thereof in a hardware compatibility list (HCL);

for each driver included in the desired image of the virtualization software, that corresponds to one of the hardware devices, determining whether or not the driver is compatible according to the hardware compatibility list;

for each firmware included in the firmware package, that corresponds to one of the hardware devices, determining whether or not the firmware is compatible according to the hardware compatibility list; and validating the desired image of the virtualization software and the firmware package to be installed in the hosts if each of the hardware device has a compatible driver and a compatible firmware in the desired image of the virtualization software and the firmware package.

12. The computer system of claim 11, wherein the method further comprises:

in response to a user input, generating a software specification that specifies the desired image of the virtualization software and a desired version of the firmware package.

13. The computer system of claim 11, wherein the HCL is implemented in a physical or virtual server running a verification service that performs the searching.

14. The computer system of claim 11, wherein a driver included in the desired image is a compatible driver if a version of the driver is listed in the HCL, and a firmware included in the firmware package is a compatible firmware if a version of the firmware is listed in the HCL.

15. The computer system of claim 11, wherein each of the hosts includes a hardware discovery service by which the hardware inventory thereof is acquired.

* * * * *